US008209964B2

(12) United States Patent  (10) Patent No.: US 8,209,964 B2
Kesse  (45) Date of Patent: Jul. 3, 2012

(54) EXHAUST CONTROL SYSTEM HAVING DIAGNOSTIC CAPABILITY

(75) Inventor: Mary Lou Kesse, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 1006 days.

(21) Appl. No.: 12/155,064

(22) Filed: May 29, 2008

(65) Prior Publication Data

US 2009/0293451 A1  Dec. 3, 2009

(51) Int. Cl.
*F01N 3/00* (2006.01)
(52) U.S. Cl. ............................................ 60/295; 60/301
(58) Field of Classification Search .................. 60/286, 60/295, 301, 311
See application file for complete search history.

(56) References Cited

U.S. PATENT DOCUMENTS

| | | | |
|---|---|---|---|
| 5,896,743 A * | 4/1999 | Griffin | 60/274 |
| 6,105,365 A | 8/2000 | Deeba et al. | |
| 6,928,806 B2 | 8/2005 | Tennison et al. | |
| 6,983,589 B2 * | 1/2006 | Lewis, Jr. et al. | 60/277 |
| 2002/0194841 A1 | 12/2002 | Genderen | |
| 2004/0098974 A1 | 5/2004 | Nieuwstadt et al. | |
| 2004/0112046 A1 | 6/2004 | Tumati et al. | |
| 2005/0252201 A1 | 11/2005 | Lecea et al. | |
| 2006/0075743 A1 * | 4/2006 | Li et al. | 60/286 |
| 2006/0130458 A1 | 6/2006 | Solbrig | |
| 2006/0137325 A1 | 6/2006 | Ikemoto et al. | |
| 2006/0201141 A1 | 9/2006 | Miller et al. | |
| 2007/0044457 A1 * | 3/2007 | Upadhyay et al. | 60/295 |
| 2007/0137181 A1 | 6/2007 | Upadhyay et al. | |
| 2007/0163240 A1 * | 7/2007 | Nishina et al. | 60/286 |
| 2007/0220865 A1 | 9/2007 | Cunningham et al. | |
| 2007/0256405 A1 | 11/2007 | Gabe et al. | |
| 2007/0295003 A1 | 12/2007 | Dingle et al. | |
| 2008/0016856 A1 | 1/2008 | Zhang et al. | |
| 2008/0022659 A1 | 1/2008 | Viola et al. | |
| 2008/0178575 A1 * | 7/2008 | Shaikh et al. | 60/274 |

* cited by examiner

*Primary Examiner* — Thomas Denion
*Assistant Examiner* — Patrick Maines
(74) *Attorney, Agent, or Firm* — Finnegan, Henderson, Farabow, Garrett & Dunner LLP

(57) ABSTRACT

An exhaust control system for use with a combustion engine having a reduction catalyst and a supply of reductant is disclosed. The exhaust control system may have a first sensor located to generate a first signal indicative of an amount of a constituent within the exhaust entering the reduction catalyst, a second sensor located to generate a second signal indicative of an amount of the constituent remaining within the exhaust exiting the reduction catalyst, and a third sensor configured to generate a third signal indicative of an amount of reductant within the supply. The exhaust control system may additionally have a controller in communication with the first sensor, the second sensor, and the third sensor. The controller may be configured to determine a change in an efficiency of the reduction catalyst based on the first and second signals, and diagnose the change in efficiency based on the third signal.

19 Claims, 6 Drawing Sheets

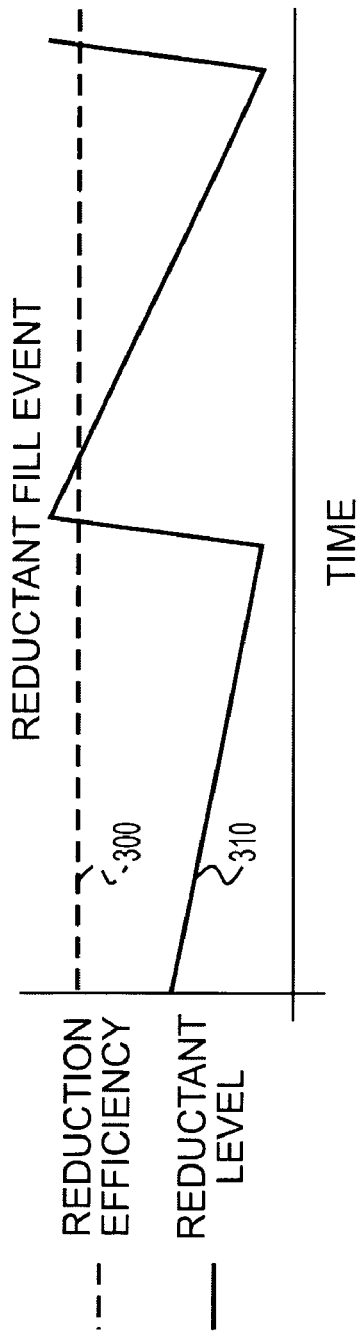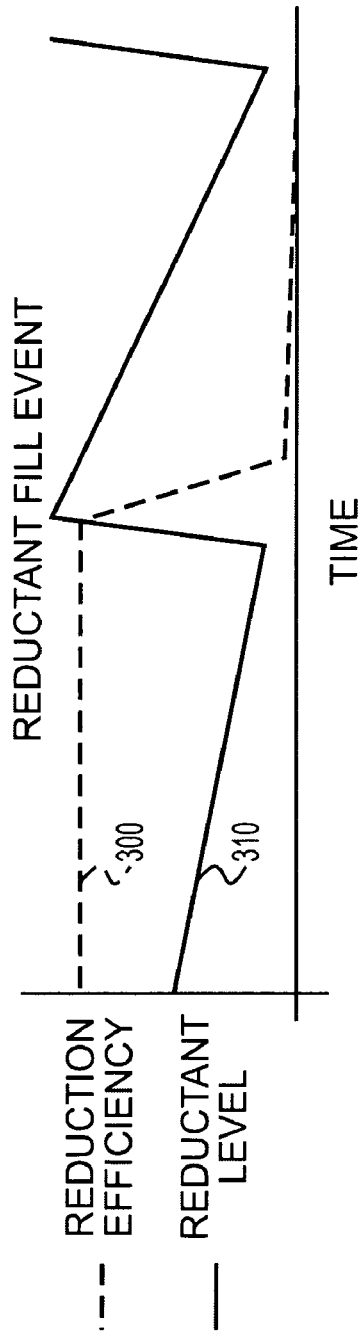

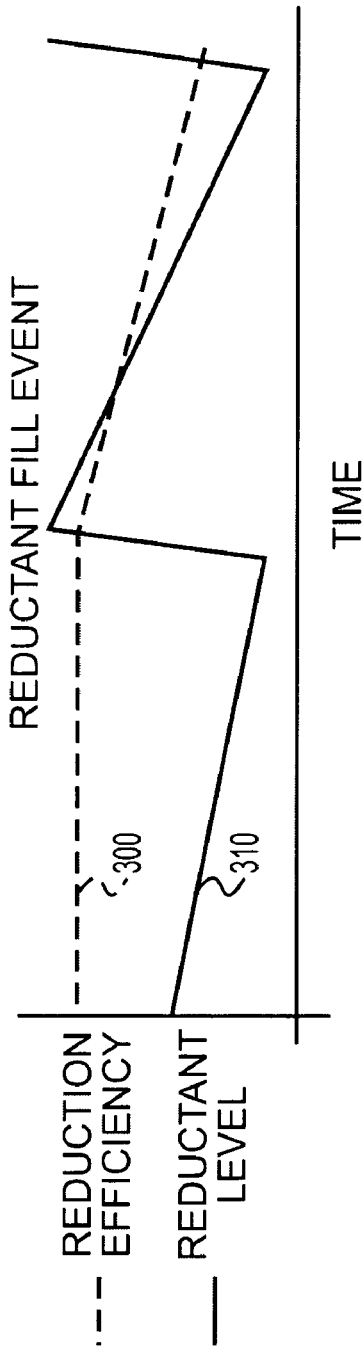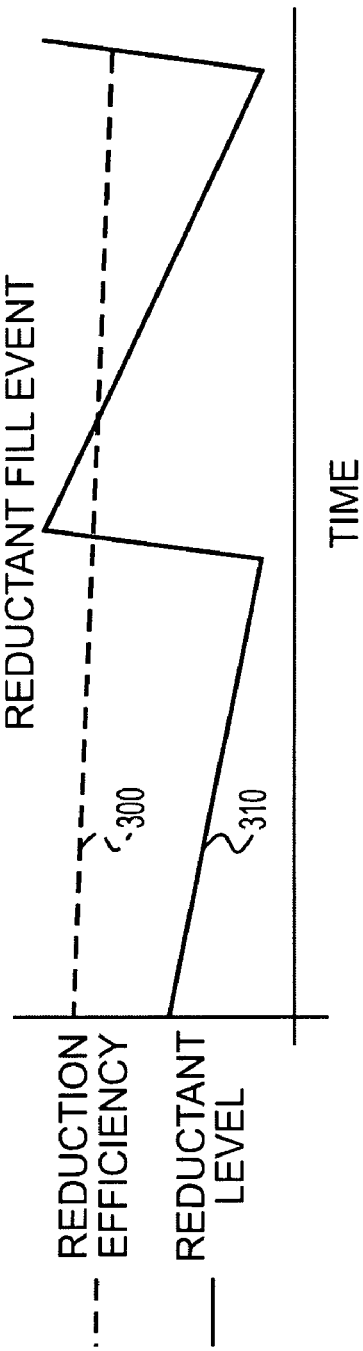

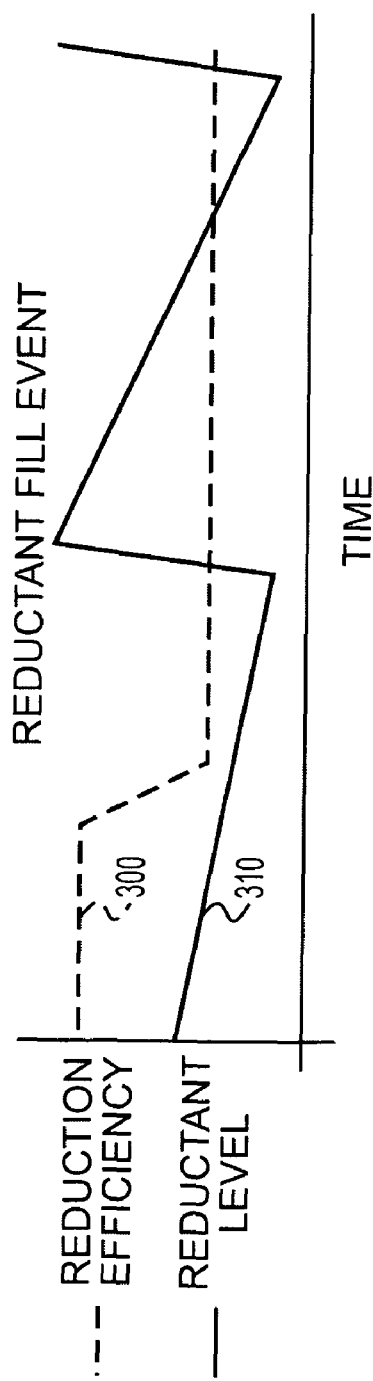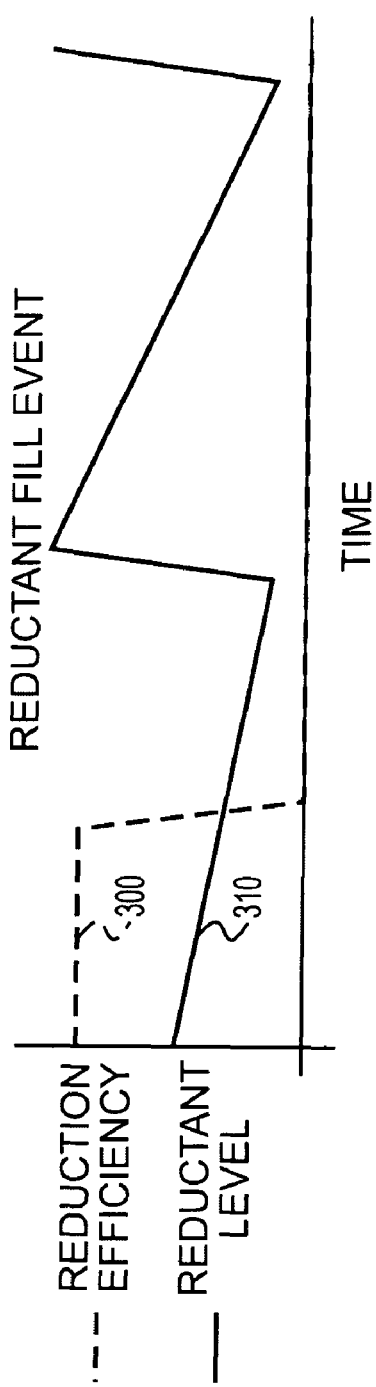

EXHAUST CONTROL SYSTEM HAVING DIAGNOSTIC CAPABILITY

TECHNICAL FIELD

The present disclosure relates generally to an exhaust control system and, more particularly, to an exhaust control system having a diagnostic capability.

BACKGROUND

Internal combustion engines, including diesel engines, gasoline engines, gaseous fuel-powered engines, and other engines known in the art exhaust a complex mixture of air pollutants. These air pollutants can include, among other things, gaseous compounds such as the oxides of nitrogen ($NO_x$). Due to increased awareness of the environment, exhaust emission standards have become more stringent, and the amount of $NO_x$ emitted from an engine may be regulated depending on the type of engine, size of engine, and/or class of engine. In order to ensure compliance with the regulation of these compounds, some engine manufacturers have implemented a process called Selective Catalytic Reduction (SCR).

SCR is a process where a gaseous or liquid reductant (most commonly a urea/water solution) is added to the exhaust gas stream of an engine and is adsorbed onto a catalyst. The reductant reacts with $NO_x$ in the exhaust gas to form water ($H_2O$) and elemental nitrogen ($N_2$). Although SCR can be effective, the $NO_x$-reduced emissions can only be realized as long as reductant of a proper quality is available in sufficient quantities for addition to the exhaust gas stream. That is, when a quality of the reductant is poor or when a supply of reductant is depleted, the reduction of $NO_x$ facilitated by SCR may be less than desired. For this reason, it can be important to monitor the quality and quantity of reductant available for use in the SCR process, and to diagnose and account for any associated deficiencies.

One system for monitoring an amount of available reductant is described in U.S. Patent Application Publication 2007/0137181 (the '181 publication), by Upadhyay et al. Specifically, the '181 publication describes an emissions control system for use with a diesel engine. The emissions control system has an SCR catalyst, a pair of $NO_x$ sensors, a temperature sensor, and a controller in communication with the $NO_x$ sensors and temperature sensor. The emissions control system reduces $NO_x$ through active injection of an aqueous urea solution into the exhaust gas entering the SCR catalyst. The $NO_x$ sensors provided upstream and downstream of the SCR catalyst, respectively, measure a concentration of $NO_x$ in the exhaust gas mixture.

During operation of the emissions control system described in the '181 publication, the controller first calculates a $NO_x$ reduction efficiency of the SCR catalyst. The controller then increases a temperature of the SCR catalyst by a predetermined amount to release a precise portion of reductant stored within the SCR catalyst. The controller then calculates the $NO_x$ reduction efficiency again, to determine an effect associated with the increased temperature. Based on the change in the $NO_x$ reduction efficiency of the SCR catalyst, the controller can determine how much reductant remains stored within the catalyst.

While the system of the '181 publication may be effective at estimating an amount of reductant stored within an SCR catalyst, it may not be effective at estimating a quality of that reductant or an amount of reductant available for injection upstream of the catalyst. Without accounting for a quality or quantity of reductant available for injection, proper operation of the emissions control system may not be possible. Further, the system of the '181 publication does not have any diagnostic capabilities to determine or account for quality or injection quantity related deficiencies.

The present disclosure is directed at overcoming one or more of the shortcomings set forth above and/or other problems of the prior art.

SUMMARY

In one aspect, the present disclosure is directed to an exhaust control system for a combustion engine having a reduction catalyst and a supply of reductant. The exhaust control system may include a first sensor located upstream of the reduction catalyst to generate a first signal indicative of an amount of a constituent within the exhaust entering the reduction catalyst, a second sensor located downstream of the reduction catalyst to generate a second signal indicative of an amount of the constituent remaining within the exhaust exiting the reduction catalyst, and a third sensor associated with the supply of reductant to generate a third signal indicative of an amount of reductant within the supply. The exhaust control system may additionally include a controller in communication with the first sensor, the second sensor, and the third sensor. The controller may be configured to determine a change in an efficiency of the reduction catalyst based on the first and second signals, and to diagnose the change in efficiency based on the third signal.

In another aspect, the present disclosure is directed to a method of diagnosing an exhaust system. The method may include sensing an amount of a constituent within a flow of exhaust, injecting a reductant into the flow of exhaust to reduce the constituent, sensing an amount of the constituent remaining within the flow of exhaust after reduction of the constituent, and sensing an amount of reductant available for injection. The method may also include determining a reduction efficiency based on the amount of constituent sensed prior to reduction and remaining after reduction, and determining a change in the reduction efficiency. The method may further include diagnosing the change in the reduction efficiency based on the amount of reductant available for injection.

BRIEF DESCRIPTION OF THE DRAWINGS

FIG. 3 is a graph depicting an exemplary relationship map associated with operation of the power system of FIG. 1;

FIG. 4 is another graph depicting an exemplary relationship map associated with operation of the power system of FIG. 1;

FIG. 5 is another graph depicting an exemplary relationship map associated with operation of the power system of FIG. 1;

FIG. 6 is another graph depicting an exemplary relationship map associated with operation of the power system of FIG. 1;

FIG. 7 is another graph depicting an exemplary relationship map associated with operation of the power system of FIG. 1;

FIG. 8 is another graph depicting an exemplary relationship map associated with operation of the power system of FIG. 1.

DETAILED DESCRIPTION

Figure 1:
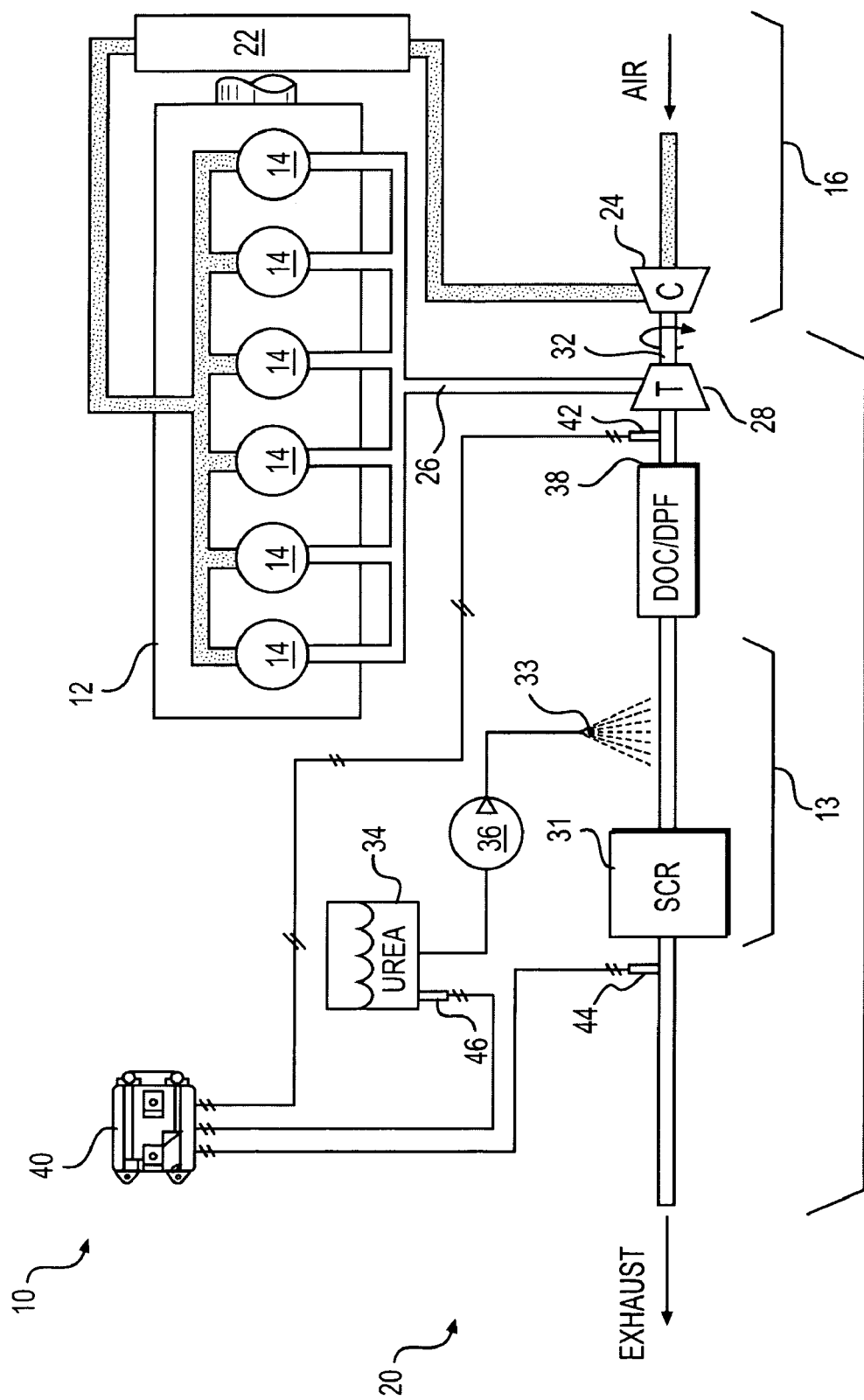
FIG. 1 is a diagrammatic illustration of an exemplary disclosed power system.

FIG. 1 illustrates an exemplary power system 10. For the purposes of this disclosure, power system 10 is depicted and described as a diesel-fueled, internal combustion engine. However, it is contemplated that power system 10 may embody any other type of combustion engine, such as, for example, a gasoline or a gaseous fuel-powered engine burning compressed or liquefied nature gas, propane, or methane. Power system 10 may include an engine block 12 at least partially defining a plurality of cylinders 14, and a plurality of piston assemblies (not shown) disposed within cylinders 14 to form a plurality of combustion chambers (not shown). It is contemplated that power system 10 may include any number of combustion chambers and that the combustion chambers may be disposed in an "in-line" configuration, a "V" configuration, or any other conventional configuration.

Multiple separate sub-systems may be included within power system 10 and cooperate to facilitate operation of power system 10. For example, power system 10 may include an air induction system 16, an exhaust system 18, and an exhaust control system 20. Air induction system 16 may be configured to direct air or an air and fuel mixture into power system 10 for subsequent combustion. Exhaust system 18 may exhaust byproducts of combustion to the atmosphere. Exhaust control system 20 may regulate operations of air induction and exhaust systems 16, 18 to reduce production of regulated constituents and their discharge to the atmosphere.

Air induction system 16 may include multiple components configured to condition and introduce compressed air into cylinders 14. For example, air induction system 16 may include an air cooler 22 located downstream of one or more compressors 24. Compressors 24 may be connected to pressurize inlet air directed through cooler 22. It is contemplated that air induction system 16 may include different or additional components than described above such as, for example, a throttle valve, variable valve actuators associated with each cylinder 14, filtering components, compressor bypass components, and other known components that may be selectively controlled to affect an air-to-fuel ratio of power system 10, if desired. It is further contemplated that compressor 24 and/or cooler 22 may be omitted, if a naturally aspirated engine is desired.

Exhaust system 18 may include multiple components that condition and direct exhaust from cylinders 14 to the atmosphere. For example, exhaust system 18 may include an exhaust passageway 26, one or more turbines 28 driven by exhaust flowing through passageway 26, and a reduction catalyst 30 fluidly connected downstream of turbine 28. It is contemplated that exhaust system 18 may include different or additional components than described above such as, for example, bypass components, an exhaust compression or restriction brake, an attenuation device, additional exhaust treatment devices, and other known components, if desired.

Turbine 28 may be located to receive exhaust leaving power system 10, and may be connected to one or more compressors 24 of air induction system 16 by way of a common shaft 32 to form a turbocharger. As the hot exhaust gases exiting power system 10 move through turbine 28 and expand against vanes (not shown) thereof, turbine 28 may rotate and drive the connected compressor 24 to pressurize inlet air.

Reduction catalyst 30 may receive exhaust from turbine 28 and reduce constituents of the exhaust. In one example, reduction catalyst 30 may embody a Selective Catalytic Reduction (SCR) device having a catalyst substrate 31 located downstream from a reductant injector 33. A gaseous or liquid reductant, most commonly urea ($(NH_2)_2CO$), a water/urea mixture, a hydrocarbon such as diesel fuel, or ammonia gas ($NH_3$), may be sprayed or otherwise advanced into the exhaust within passageway 26 at a location upstream of catalyst substrate 31 by reductant injector 33. This process of injecting reductant upstream of catalyst substrate 31 may be known as dosing catalyst substrate 31. To facilitate dosing of catalyst substrate 31 by reductant injector 33, an onboard supply 34 of reductant and a pressurizing device 36 may be associated with reductant injector 33. The reductant sprayed into passageway 26 may flow downstream with the exhaust from power system 10 and be adsorbed onto the surface of catalyst substrate 31, where the reductant may react with $NO_X$ (NO and $NO_2$) in the exhaust gas to form water ($H_2O$) and elemental nitrogen ($N_2$). This reduction process performed by reduction catalyst 30 may be most effective when a concentration of NO to $NO_2$ supplied to reduction catalyst 30 is about 1:1.

To help provide the correct concentration of NO to $NO_2$, an oxidation catalyst 38 may be located upstream of reduction catalyst 30, in some embodiments. Oxidation catalyst 38 may be, for example, a diesel oxidation catalyst (DOC). As a DOC, oxidation catalyst 38 may include a porous ceramic honeycomb structure or a metal mesh substrate coated with a material, for example a precious metal, that catalyzes a chemical reaction to alter the composition of the exhaust. For instance, oxidation catalyst 38 may include a washcoat of palladium, platinum, vanadium, or a mixture thereof that facilitates the conversion of NO to $NO_2$.

In one embodiment, oxidation catalyst 38 may also perform particulate trapping functions. That is, oxidation catalyst 38 may be a catalyzed particulate trap such as a continuously regeneration particulate trap or a catalyzed continuously regenerating particulate trap. A particulate trap is a filter designed to trap or collect particulate matter.

Exhaust control system 20 may include components configured to regulate the treatment of exhaust prior to discharge to the atmosphere. Specifically, exhaust control system 20 may include a controller 40 in communication with a plurality of sensors. Based on input from each of the sensors, controller 40 may determine an amount of $NO_X$ being produced by power system 10, a performance parameter of reduction catalyst 30 (e.g., a reduction efficiency), a history of the performance parameter (e.g., the reduction efficiency tracked over a period of time), an amount of reductant remaining within supply 34, a history of the reductant supply level (e.g., the amount of reductant remaining within supply 34 tracked over a period of time), and an amount of reductant that should be sprayed by reductant injector 33 into the exhaust flow of passageway 26 to sufficiently reduce the $NO_X$ present within the exhaust. Controller 40 may then regulate operation of reductant injector 33 such that an appropriate amount of urea is sprayed into the exhaust flow upstream of catalyst substrate 31. In addition, controller 40 may be capable of diagnosing deficiencies and/or problems associated with exhaust system 18 and adjusting operation of exhaust system 18 and/or alerting an operator thereof in response to the diagnosis.

Controller 40 may embody a single or multiple microprocessors, field programmable gate arrays (FPGAs), digital signal processors (DSPs), etc. that include a means for controlling an operation of power system 10 in response to signals received from the various sensors. Numerous commercially available microprocessors can be configured to perform the functions of controller 40. It should be appreciated that controller 40 could readily embody a microprocessor separate from that controlling other non-exhaust related power system functions, or that controller 40 could be integral with a general power system microprocessor and be capable of controlling numerous power system functions and modes of operation. If separate from a general power system microprocessor, controller 40 may communicate with the general power system microprocessor via data links or other methods. Various other known circuits may be associated with controller 40, including power supply circuitry, signal-conditioning circuitry, actuator driver circuitry (i.e., circuitry powering solenoids, motors, or piezo actuators), communication circuitry, and other appropriate circuitry.

A first sensor 42 of exhaust control system 20 may embody a constituent sensor configured to generate a constituent production signal indicative of a presence of a particular constituent within the exhaust flow of passageway 26. For instance, sensor 42 may be a $NO_X$ sensor configured to determine an amount (i.e., a quantity, a relative percent, a ratio, etc.) of NO and/or $NO_2$ present within the exhaust of power system 10. If embodied as a physical sensor, sensor 42 may be located upstream or downstream of oxidation catalyst 38, but always upstream of reduction catalyst 30. When located upstream of oxidation catalyst 38, sensor 42 may be situated to sense a production of $NO_X$ by power system 10. When located downstream of oxidation catalyst 38, sensor 42 may be situated to sense the production of $NO_X$ and/or a conversion effectiveness of oxidation catalyst 38. Sensor 42 may generate the constituent production signal indicative of these measurements and send it to controller 40.

It is contemplated that sensor 42 may alternatively embody a virtual sensor. A virtual sensor may produce a model-driven estimate based on one or more known or sensed operational parameters of power system 10 and/or oxidation catalyst 38. For example, based on a known operating speed, load, temperature, boost pressure, ambient conditions (humidity, pressure, temperature, etc.), and/or other parameters of power system 10, a model may be referenced to determine an amount of NO and/or $NO_2$ produced by power system 10. Similarly, based on a known or estimated $NO_X$ production of power system 10, a flow rate of exhaust exiting power system 10, and/or a temperature of the exhaust, the model may be referenced to determine an amount of NO and/or $NO_2$ leaving oxidation catalyst 38 and entering reduction catalyst 30. As a result, the constituent production signal directed from sensor 42 to controller 40 may be based on calculated and/or estimated values rather than direct measurements, if desired. It is contemplated that rather than a separate element, these virtual sensing functions may alternatively be accomplished by controller 40, if desired.

A second sensor 44 of exhaust control system 20, similar to first sensor 42, may embody a constituent sensor configured to generate a constituent remaining signal indicative of a presence of a particular constituent within the exhaust flow of passageway 26. For instance, sensor 44 may be a $NO_X$ sensor located downstream of catalyst substrate 31 and configured to determine an amount (i.e., a quantity, a relative percent, a ratio, etc.) of NO and/or $NO_2$ remaining within the exhaust flow exiting reduction catalyst 30. Sensor 44 may generate the constituent remaining signal indicative of these measurements and send it to controller 40.

A third sensor 46 of exhaust control system 20 may be associated with supply 34. Sensor 46 may be a fluid level sensor, for example an RF sensor, a float sensor, a pressure sensor, or another type of sensor configured to generate a reductant level signal indicative of an amount of reductant available for injection. This signal may be directed from sensor 46 to controller 40.

As will be described in the following section with respect to the flow chart of FIG. 2, the constituent production, the constituent remaining, and the reductant level signals from sensors 42-46 may be utilized by controller 40 to determine an amount of reductant that should be injected to reduce the produced $NO_X$ to an acceptable level, to confirm proper operation of exhaust system 18, and to diagnose problems associated with exhaust system 18. To facilitate the diagnostic capabilities of controller 40, one or more relationship maps may be stored in the memory of and periodically referenced by controller 40. The map(s) may include a collection of data in the form of tables, graphs, and/or equations (e.g., regression equations, neural network models, decision or binary tree models, physics equations that describe a system, etc.) that represents one or more intended relationships.

For example, a first map illustrated in FIG. 3 may be representative of normal exhaust system operation (i.e., operation when a sufficient supply of acceptable quality reductant is available for use in reduction catalyst 30). In this map, a first trace 300 may illustrate a $NO_X$ reduction efficiency of reduction catalyst 30. This first trace 300 may be a function of the constituent production and constituent remaining signals received from sensors 42 and 44. During normal operation of power system 10, the $NO_X$ reduction efficiency of reduction catalyst 30 should remain substantially constant, as long as a sufficient supply of acceptable quality reductant is available. A second trace 310 may illustrate a quantity of reductant available for injection and may be a function of the reductant level signal received from sensor 46. During operation of power system 10, the amount of reductant within supply 34 should reduce gradually over time, with periodic dramatic increases. The gradual reductions may correspond with normal consumption of reductant by reductant injector 33, while the periodic dramatic increases may correspond with a refill of new reductant (i.e., with a reductant fill event).

A second map illustrated in FIG. 4, may be representative of a first malfunction of exhaust system 18. In this map, as illustrated by first and second traces 300, 310, the $NO_X$ reduction efficiency of reduction catalyst 30 can be seen to dramatically decrease at a point in time substantially corresponding to a reductant fill event. This situation may occur, for example, when the fluid added to supply 34 during that fill event is something other than reductant or is of very poor quality.

A third map illustrated in FIG. 5, may be representative of a second malfunction of exhaust system 18. In this map, as illustrated by first and second traces 300, 310, the $NO_X$ reduction efficiency of reduction catalyst 30 can be seen to gradually decrease after the point in time corresponding to a reductant fill event. This situation may occur, for example, when the fluid added to supply 34 is an improper reductant solution (e.g., a weak or poor quality reductant solution).

A fourth map illustrated in FIG. 6, may be representative of a third malfunction of exhaust system 18. In this map, as illustrated by first and second traces 300,310, the $NO_X$ reduction efficiency of reduction catalyst 30 can be seen to gradually decrease independent of a reductant fill event. This situation may correspond, for example, with thermal aging of catalyst substrate 31.

A fifth map illustrated in FIG. 7, may be representative of a fourth malfunction of exhaust system 18. In this map, as illustrated by first and second traces 300, 310, the $NO_X$ reduction efficiency of reduction catalyst 30 can be seen to dramatically decrease to a non-zero condition independent of a reductant fill event. This situation may occur, for example, when reductant injector 33 becomes partially clogged.

A sixth map illustrated in FIG. 8, may be representative of a fifth malfunction of exhaust system 18. In this map, as illustrated by first and second traces 300, 310, the $NO_X$ reduction efficiency of reduction catalyst 30 can be seen to dramatically decrease to zero independent of a reductant fill event. This situation may occur, for example, when reduction catalyst 30 has catastrophically failed.

Figure 9:
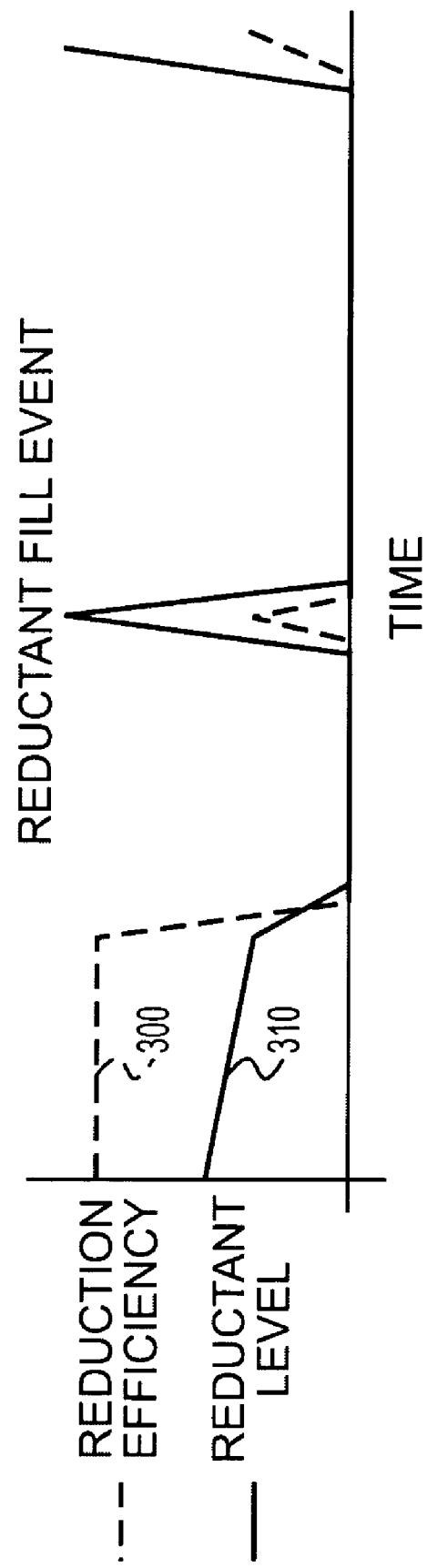
FIG. 9 is another graph depicting an exemplary relationship map associated with operation of the power system of FIG. 1.

A seventh map illustrated in FIG. 9, may be representative of a sixth malfunction of exhaust system 18. In this map, as illustrated by first and second traces 300, 310, the $NO_X$ reduction efficiency of reduction catalyst 30 can be seen to dramatically decrease to about zero at about the same time that the supply of reductant also suddenly decreases to about zero. This situation may occur, for example, when supply 34 has developed a leak.

As will be explained in more detail below, controller 40 may monitor the performance of power system 10, reference the relationship maps described above, and respond accordingly. For example, controller 40 may detect abnormal power system operation (e.g., an exhaust system malfunction described above), diagnose the abnormal operation, warn an operator of power system 10 about the abnormal operation, and/or adjust operation of reduction catalyst 30 to account for the abnormal operation.

Industrial Applicability

The exhaust control system of the present disclosure may be applicable to any power system having a reduction catalyst, where operational monitoring and diagnosing of the system is important. The disclosed exhaust control system may monitor an efficiency of the reduction catalyst and a fluid level of an associated reductant supply to determine an operational status of the disclosed power system. And, when improper operation is determined, the disclosed exhaust control system may diagnose a likely cause of the improper operation and respond accordingly. Operation of exhaust control system 20 will now be described.

Referring to FIG. 1, air induction system 16 may pressurize and force air or a mixture of air and fuel into cylinders 14 of power system 10 for subsequent combustion. The fuel and air mixture may be combusted by power system 10 to produce a mechanical work output and an exhaust flow of hot gases. The exhaust flow may contain a complex mixture of air pollutants composed of gaseous compounds, which can include the oxides of nitrogen ($NO_X$).

As the $NO_X$-laden exhaust flow is directed from cylinders 14 through passageway 26 and turbine 24 to oxidation catalyst 38, NO may be converted to $NO_2$. Following oxidation catalyst 38, the exhaust flow may be directed toward reduction catalyst 30, where the $NO_X$ may be reduced to water ($H_2O$) and elemental nitrogen ($N_2$). Prior to reaching reduction catalyst 30, controller 40 may, based at least partially on input from one or both of sensors 42 and 44 and/or the maps stored in memory, determine an amount of reductant required for adsorption on catalyst substrate 31 to sufficiently reduce the $NO_X$ produced by power system 10. Controller 40 may then adjust operation of reductant injector 33 to spray the amount of reductant into the exhaust upstream of catalyst substrate 31 for use thereby (i.e., controller 40 may adjust dosing of catalyst substrate 31 by reductant injector 33). After reduction within reduction catalyst 30, the exhaust may pass to the atmosphere.

Figure 2:
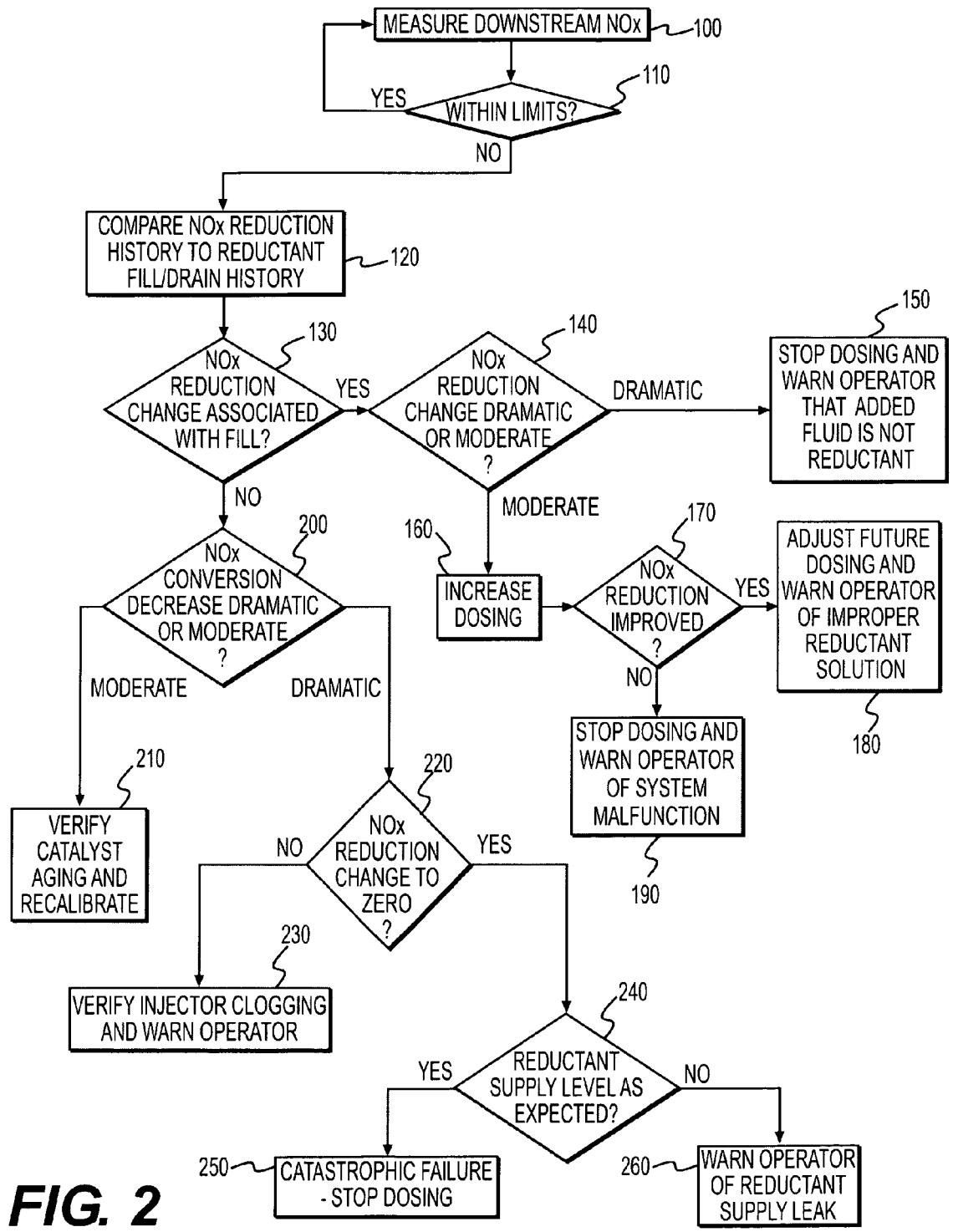
FIG. 2 is a flowchart depicting an exemplary disclosed method performed by the power system of FIG. 1.

As illustrated in FIG. 2, during operation of power system 10, controller 40 may monitor the performance and adjust the operation of exhaust system 18. In particular, controller 40 may continuously monitor and/or record an amount of $NO_X$ in the exhaust passing to the atmosphere (i.e., in the exhaust downstream of reduction catalyst 30) by analyzing the constituent remaining signal generated by second sensor 44 (Step 100). Controller 40 may then compare this amount of $NO_X$ to one or more predefined limits to determine if reduction catalyst 30 is operating as expected (Step 110). If the amount of $NO_X$ passing to the atmosphere is within the predefined limit (s), it can be concluded that reduction catalyst 30 is performing correctly, and power system 10 may be allowed to continue operating without interference (i.e., control may return from step 110 to step 100).

However, if the amount of $NO_X$ passing to the atmosphere substantially matches or exceeds the predefined limit(s), it can be concluded that a change in the efficiency of reduction catalyst 30 (i.e., a change in the amount of $NO_X$ measured downstream of reduction catalyst 30 relative to the amount of $NO_X$ measured upstream of reduction catalyst 30) has occurred. As a result, controller 40 may compare the $NO_X$ reduction efficiency of reduction catalyst 30 tracked over a period of time to a reductant supply history (i.e., to a history of reductant fill and drain events associated with supply 34) (Step 120). Based on this comparison, controller 40 may then determine if the change in the $NO_X$ reduction efficiency that has occurred is associated with a reductant fill event (Step 130).

If the change in $NO_X$ reduction efficiency is associated with a reductant fill event (i.e., begins or occurs at about the same time as a reduction fill event), controller 40 may determine if the change in $NO_X$ reduction efficiency is a dramatic change or a moderate change (Step 140). The change in $NO_X$ reduction efficiency may be a dramatic change if the change is greater than a predetermined amount within a given time period. If the $NO_X$ reduction efficiency change is less than the predetermined amount within the given time period, the $NO_X$ reduction efficiency may be considered a moderate change. In response to a dramatic change, controller 40 may regulate reductant injector 33 to stop dosing (i.e., to stop spraying reductant into passageway 26), and warn an operator of power system 10 that the fluid added during the most recent fill event may not be reductant and may be the predominant cause (i.e., significant factor) of the change in reduction efficiency (Step 150). This situation may correspond with the map of FIG. 4, which controller 40 may reference when completing steps 140 and/or 150.

However, if the change in $NO_X$ reduction efficiency is associated with a reductant fill event, but is moderate in magnitude, controller 40 may perform further diagnostics. Specifically, controller 40 may regulate reductant injector to increase dosing (Step 160) and monitor the reduction efficiency of reduction catalyst 30 for any improvement (i.e., to help determine if $NO_X$ reduction is improved as a result of the increased dosing) (Step 170). If, after increasing dosing, controller 40 determines that the reduction efficiency of reduction catalyst 30 increases by a corresponding amount, controller 40 may recalibrate exhaust control system 20 to adjust future dosing accordingly, and warn the operator of power system 10 that an improper solution of reductant may have been added during the most recent fill event and may be the predominant cause of the change in reduction efficiency (Step 180). This situation may correspond with the map of FIG. 5, which controller 40 may reference when completing step any of steps 160-180. In contrast, if after increasing dosing, controller 40 determines that the reduction efficiency of reduction catalyst 30 does not increase by a corresponding amount, controller 40 may regulate reductant injector 33 to stop dosing, and warn the operator of system malfunction (Step 190).

Returning to step 130, if controller 40 determines that the change in reduction efficiency of reduction catalyst 30 is not associated with a fill event (i.e., is independent of a fill event), controller 40 may determine if the change in $NO_X$ reduction efficiency is a dramatic change or a moderate change (Step 200). For a moderate change in the reduction efficiency of reduction catalyst 30, controller 40 may determine that thermal aging may be the predominant cause of the change in reduction efficiency. This situation may correspond with the map of FIG. 6, which controller 40 may reference when completing step 200. As a result, controller 40 may verify the thermal aging of catalyst substrate 31, and recalibrate exhaust control system 20 accordingly (Step 210). To verify the thermal aging of catalyst substrate 31, controller 40 may analyze temperature measurements or temperature estimates of catalyst substrate 31 taken over its operational life and compare this temperature history to an expected durability of catalyst substrate 31. For this purpose, an additional physical or virtual temperature sensor (not shown) may be included within exhaust control system 20, if desired.

If, at step 200, controller 40 determines that the change in reduction efficiency of reduction catalyst 30 is a dramatic change, controller 40 may determine if the change is a decrease to about zero (i.e., controller 40 may determine if reduction catalyst 30 is reducing any $NO_X$ at all) (Step 220). If the change in reduction efficiency is dramatic, but is not reduced to about zero (i.e., reduction catalyst 30 is still functioning, just at a capacity significantly lower than expected), controller 40 may determine that clogging of reductant injector 33 may be the predominant cause of the change in reduction efficiency. This situation may correspond with the map of FIG. 7, which controller 40 may reference when completing step 220. As a result, controller 40 may verify the clogging of reductant injector 33, and warn the operator accordingly (Step 230). To verify the clogging of reductant injector 33, controller 40 may monitor a pressure of the fluid within and/or a flow rate of the fluid through reductant injector 33, and compare these values to expected values. For this purpose, additional pressure and/or flow sensors (not shown) may be included within exhaust control system 20, if desired.

However, if, at step 220, controller 40 determines that the change in reduction efficiency of reduction catalyst 30 is a moderate change, controller 40 may compare the current quantity of reductant within supply 34 to an expected quantity (Step 240). If the current quantity of reductant, as indicated by the signal from sensor 46, is as expected, controller 40 may determine that a catastrophic failure may have occurred, and stop dosing by reductant injector 33 (Step 250). This situation may correspond with the map of FIG. 8, which controller 40 may reference when completing step 240. In contrast, if the current quantity of reductant is significantly less than the expected quantity (i.e., less than the expected quantity by a threshold amount), controller 40 may determine that supply 34 has most likely developed a leak and that the leak may be the predominant cause of the change in efficiency. This situation may correspond with the map of FIG. 9, which controller 40 may reference when completing step 250. In response to the leak determination, controller 40 may provide a warning to the operator of power system 10 (Step 260) and continue dosing until supply 34 is depleted.

Several advantages may be associated with the disclosed exhaust system. For example, the disclosed exhaust system may be operable to determine an amount of reductant within supply 34, as well as a quality of that reductant (i.e., if the fluid within supply 34 is reductant and if that reductant is a proper solution). Further, the disclosed exhaust system may be capable of diagnosing problems with reduction catalyst 30, and adjusting operation of power system 10 accordingly.

It will be apparent to those skilled in the art that various modifications and variations can be made to the exhaust control system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. An exhaust control system for a combustion engine having a reduction catalyst, a reductant injector located upstream of the reduction catalyst, and a supply of reductant, the reduction catalyst includes a catalyst substrate, the exhaust control system comprising:
   a first sensor located upstream of the reduction catalyst to generate a first signal indicative of an amount of a constituent within the exhaust entering the reduction catalyst;
   a second sensor located downstream of the reduction catalyst to generate a second signal indicative of an amount of the constituent remaining within the exhaust exiting the reduction catalyst;
   a third sensor associated with the supply of reductant to generate a third signal indicative of an amount of reductant within the supply; and
   a controller in communication with the first sensor, the second sensor, and the third sensor, the controller being configured to:
      determine a change in an efficiency of the reduction catalyst based on the first and second signals;
      diagnose the change in efficiency based on the third signal by determining that a fluid added to the supply during a fill event has an improper solution when the change in efficiency corresponds to a fill event of the supply and is less than a first amount;
      verify the improper solution; and
      adjust future reductant dosing of the catalyst substrate by the reductant injector based on the verification in response to the diagnosis.

2. The exhaust control system of claim 1, wherein the controller is configured to:
   determine a second change in the efficiency of the reduction catalyst based on the first and second signals; and
   determine that a quality of the reductant within the supply is a cause of the second change in efficiency when the second change in efficiency corresponds to a fill event of the supply.

3. The exhaust control system of claim 2, wherein the controller is configured to determine that a fluid added to the supply during the fill event is not reductant when the second change in efficiency corresponding to the fill event is greater than a second amount.

4. The exhaust control system of claim 1, wherein the controller is configured to increase reductant dosing of the catalyst substrate by the reductant injector and monitor the efficiency of the reduction catalyst during the increased reductant dosing to verify the improper solution.

5. The exhaust control system of claim 1, wherein the controller is configured to:
   determine a second change in the efficiency of the reduction catalyst based on the first and second signals; and
   determine that thermal aging of the reduction catalyst is a cause of the second change in efficiency when the second change in efficiency is less than a second amount and independent of a fill event of the supply.

6. The exhaust control system of claim 5, wherein:
the controller is further configured to verify the thermal aging as a cause of the second change in efficiency and adjust future reductant dosing of the catalyst substrate by the reductant injector based on the verification.

7. The exhaust control system of claim 6, wherein the controller is configured to analyze a temperature history of the catalyst substrate to verify the thermal aging.

8. The exhaust control system of claim 1, wherein:
the controller is configured to:
determine a second change in the efficiency of the reduction catalyst based on the first and second signals; and
determine that clogging of the reductant injector is a cause of the second change in efficiency when the second change in efficiency is greater than a second amount, the second change in efficiency is independent of a fill event of the supply, and the efficiency of the reduction catalyst is non-zero.

9. The exhaust control system of claim 8, wherein the controller is further configured to verify the clogging of the reductant injector as a cause of the second change in efficiency and warn an operator of the exhaust system in response to the verification.

10. The exhaust control system of claim 9, wherein the controller is configured to monitor at least one of a pressure and a flow rate of the reductant injector to verify the clogging of the reductant injector as a cause of the second change in efficiency.

11. The exhaust control system of claim 1, wherein the controller is configured to:
determine a second change in the efficiency of the reduction catalyst based on the first and second signals; and
determine that a leak in the supply of reductant is a cause of the second change in efficiency when the second change in efficiency is greater than a second amount, the second change in efficiency is independent of a fill event of the supply, and the efficiency of the reduction catalyst is zero.

12. The exhaust control system of claim 1, wherein:
the constituent is NOX; and
the reductant includes urea.

13. A method of diagnosing an exhaust system, the method comprising:
sensing an amount of a constituent within a flow of exhaust;
injecting a reductant into the flow of exhaust to reduce the constituent;
sensing an amount of the constituent remaining within the flow of exhaust after reduction of the constituent;
sensing an amount of reductant available for injection;
determining a reduction efficiency based on the amount of constituent sensed prior to reduction and remaining after reduction;
determining a change in the reduction efficiency; and
diagnosing the change in the reduction efficiency as being caused by a leak in a supply of the reductant based on the sensed amount of reductant available for injection.

14. The method of claim 13, further including:
determining a second change in the reduction efficiency; and
determining that a quality of the reductant is a cause of the second change in reduction efficiency when the second change in reduction efficiency corresponds to a reductant fill event.

15. The method of claim 13, further including:
determining a second change in the reduction efficiency; and
determining that thermal aging of a catalyst substrate is a cause of the second change in reduction efficiency when the second change in reduction efficiency is less than an amount and independent of a reductant fill event.

16. The method of claim 13, further including:
determining a second change in the reduction efficiency; and
determining that clogging of a reductant injector is a cause of the second change in reduction efficiency when the second change in reduction efficiency is greater than an amount, the second change in reduction efficiency is independent of a reductant fill event, and the reduction efficiency is non-zero.

17. The method of claim 13, wherein diagnosing includes determining that the leak in the supply of the reductant is a cause of the change in reduction efficiency when the change in reduction efficiency is greater than an amount, the change in reduction efficiency is independent of a reductant fill event, and the reduction efficiency is zero.

18. A power system, comprising:
a combustion engine configured to produce exhaust;
a passageway configured to receive exhaust from the combustion engine;
a catalyst substrate located within the passageway;
a reductant injector located upstream of the catalyst substrate;
a first NOX sensor located to generate a first signal indicative of an amount of NOX within the exhaust entering the catalyst substrate;
a second NOX sensor located to generate a second signal indicative of an amount of NOX remaining within the exhaust exiting the catalyst substrate;
a supply of reductant in fluid communication with the reductant injector;
a fluid level sensor configured to generate a third signal indicative of an amount of reductant within the supply; and
a controller in communication with the first NOX sensor, the second NOX sensor, and the fluid level sensor, the controller being configured to:
determine a change in an efficiency of the catalyst substrate based on the first and second signals; and
diagnose the change in efficiency as being caused by a clogging of the reductant injector based on the third signal.

19. The power system of claim 18, wherein the controller is configured to diagnose the change in efficiency as being caused by the clogging of the reductant injector when the change in reduction efficiency is greater than an amount, the change in reduction efficiency is independent of a reductant fill event, and the efficiency of the reduction catalyst is non-zero.

* * * * *